United States Patent
Toyooka

(10) Patent No.: US 9,961,312 B2
(45) Date of Patent: May 1, 2018

(54) PROJECTOR AND METHOD OF CONTROLLING PROJECTOR

(71) Applicant: SEIKO EPSON CORPORATION, Tokyo (JP)

(72) Inventor: Takashi Toyooka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/408,013

(22) Filed: Jan. 17, 2017

(65) Prior Publication Data

US 2017/0208301 A1 Jul. 20, 2017

(30) Foreign Application Priority Data

Jan. 19, 2016 (JP) .................... 2016-007975

(51) Int. Cl.
*H04N 9/31* (2006.01)
*G03B 21/20* (2006.01)

(52) U.S. Cl.
CPC ....... *H04N 9/3155* (2013.01); *G03B 21/2053* (2013.01); *H04N 9/3161* (2013.01); *H04N 9/3179* (2013.01); *H04N 9/3194* (2013.01)

(58) Field of Classification Search
CPC .. G03B 21/16; G03B 21/206; G03B 21/2053; H04N 9/3144; H04N 9/3155; H04N 9/3161; H04N 9/3179; H04N 9/3194
See application file for complete search history.

(56) References Cited

U.S. PATENT DOCUMENTS

| | | | | |
|---|---|---|---|---|
| 2002/0001065 A1* | 1/2002 | Takizawa | ............... | G03B 21/16 353/31 |
| 2005/0219467 A1* | 10/2005 | Nomizo | ................. | G03B 21/26 353/30 |
| 2007/0086075 A1* | 4/2007 | Takeuchi | ................. | G03B 9/06 359/227 |
| 2007/0229777 A1* | 10/2007 | Tanaka | ................... | G03B 33/08 353/84 |
| 2013/0148085 A1* | 6/2013 | Sakamoto | ............. | G03B 21/16 353/52 |

FOREIGN PATENT DOCUMENTS

JP 2015-129783 A 7/2015

* cited by examiner

*Primary Examiner* — Sultan Chowdhury
(74) *Attorney, Agent, or Firm* — Oliff PLC

(57) ABSTRACT

A projector includes a light source, an information acquisition section adapted to obtain information of designating light intensity of light emitted by the light source, an arithmetic section adapted to calculate time for which the light source can be used with the light intensity represented by the information obtained by the information acquisition section, and a notification section adapted to give notification of the time calculated by the arithmetic section.

13 Claims, 9 Drawing Sheets

PROJECTOR AND METHOD OF CONTROLLING PROJECTOR

CROSS-REFERENCE

The entire disclosure of Japanese Patent Application No. 2016-007975, filed Jan. 19, 2016 is expressly incorporated by reference herein.

BACKGROUND

1. Technical Field

The present invention relates to a projector, and a method of controlling a projector.

2. Related Art

As a projector for displaying an image with a desired amount of light, there is a projector disclosed in, for example, JP-A-2015-129783. The projector detects a changing state of a light source with an optical sensor, then generates a table, which has the luminance of the light source and the value of a current for driving the light source so as to correspond to each other, based on the detection result, and then control the light source using the table thus generated.

The light source used in the projector deteriorates due to use. As the deterioration of the light source progresses, display with the desired brightness becomes unachievable. In order to prevent the display with the desired brightness from becoming unachievable, it is preferable for the user to figure out the deterioration of the light source in advance.

SUMMARY

An advantage of some aspects of the invention is to provide a technology of notifying the user of a time period for which the light source can be used.

An aspect of the invention provides a projector including a light source, an information acquisition section adapted to obtain information of designating light intensity of light emitted by the light source, an arithmetic section adapted to calculate time for which the light source can be used with the light intensity represented by the information obtained by the information acquisition section, and a notification section adapted to give notification of the time calculated by the arithmetic section.

According to this aspect of the invention, it is possible to notify the user of the time for which the light source can be used.

The aspect of the invention may be configured such that the projector further includes a drive section adapted to drive the light source so that the light source emits light with the light intensity represented by the information obtained by the information acquisition section, and the arithmetic section calculates the time for which the light source can be used in a state in which the light source keeps the light intensity.

According to this configuration, it is possible to notify the user of the time for which the light source can be used while keeping the light intensity of the light source.

The aspect of the invention may be configured such that the projector further includes a sensor adapted to detect the light intensity of the light emitted by the light source, the drive section controlling a current supplied to the light source to thereby control the light intensity of the light emitted by the light source, and a calibration section adapted to calibrate the current used to drive the light source in accordance with the light intensity detected by the sensor at a predetermined timing, and the arithmetic section recalculates the time in a case in which the calibration is performed.

According to this configuration, it is possible to recalculate the time for which the light source can be used to notify the user of the time when the light source deteriorates.

The aspect of the invention may be configured such that the calibration section calibrates the current used to drive the light source based on the light intensity detected by the sensor when setting the current to a predetermined current value, and the light intensity detected by the sensor when the drive section drives the light source in accordance with the light intensity represented by the information obtained by the information acquisition section.

According to this configuration, it is possible to form the current for driving the light source when the light source deteriorates.

The aspect of the invention may be configured such that the arithmetic section performs the calculation based on drive time of the light source and drive time of the light source calculated from the light intensity detected by the sensor.

According to this configuration, it is possible to approximate the available time obtained by the calculation to the actual available time.

The aspect of the invention may be configured such that the arithmetic section performs the calculation based on a ratio between estimated time, for which the light source can be used, determined in accordance with the light intensity represented by the information obtained by the information acquisition section, and estimated time, for which the light source can be used, determined in accordance with the light intensity of the light emitted by the light source.

According to this configuration, it is possible to approximate the available time obtained by the calculation to the actual available time.

The aspect of the invention may be configured such that the light intensity of the light emitted by the light source is detected by the sensor.

According to this configuration, it is possible to approximate the available time obtained by the calculation to the actual available time.

Another aspect of the invention provides a method of controlling a projector including obtaining information of designating light intensity of light emitted by the light source, calculating time, for which the light source can be used with the light intensity represented by the information obtained in the obtaining information, and giving notification of the time calculated in the calculating time.

According to this aspect of the invention, it is possible to notify the user of the time for which the light source can be used.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Configuration of Embodiment

Figure 1:
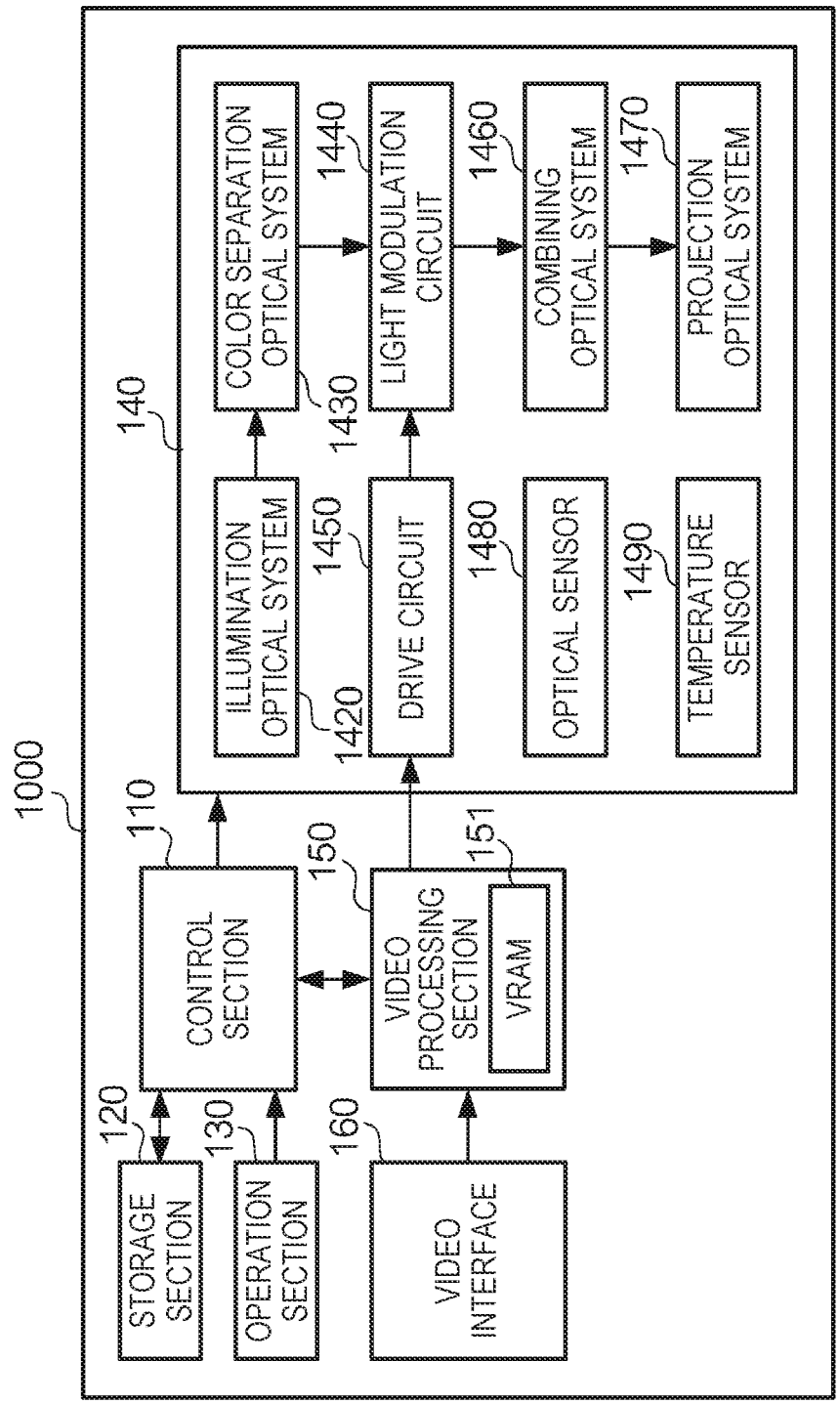
FIG. 1 is a block diagram showing a configuration of a projector 1000.

FIG. 1 is a block diagram showing a configuration of a projector 1000 according to an embodiment of the invention. The projector 1000 as an example of a display device projects an image, which is represented by a video signal supplied from an external device, on a projection surface such as a screen or a wall surface.

The projector 1000 is provided with a control section 110, a storage section 120, an operation section 130, and a projection section 140. Further, the projector 1000 is provided with a video processing section 150, and a video interface 160. The control section 110 is a microcomputer provided with a central processing unit (CPU), a read only memory (ROM), and a random access memory (RAM). When the CPU executes a program stored in the ROM, the control section 110 controls each section to realize a function of projecting an image, a function of setting the image quality of the image to be projected, a function of providing a user with information related to a light source of the projector 1000, and so on.

The video interface 160 has a plurality of connectors supplied with a video signal such as RCA, D-sub, HDMI (registered trademark), or USB (universal serial bus), and supplies the video processing section 150 with the video signal, which has been supplied from the external device to the connectors. The video interface 160 is an example of a video acquisition unit for obtaining a plurality of video signals. It is also possible for the video interface 160 to have an interface for wireless communication such as wireless LAN or Bluetooth (registered trademark) to obtain the video signals with the wireless communication.

The storage section 120 stores a setting value related to the image quality of the picture to be projected, information related to a variety of functions, and information to be processed by the control section 110, and so on. The operation section 130 is provided with a plurality of buttons for operating the projector 1000. By the control section 110 controlling each section in accordance with the button having been operated, an adjustment of the image to be projected on the screen SCR, setting of a variety of functions provided to the projector 1000, and so on are performed. Further, the operation section 130 is provided with a light receiving section (not shown) for receiving an infrared signal from a remote controller (not shown). The operation section 130 converts the signal transmitted from the remote controller into an electric signal to supply the result to the control section 110, and then the control section 110 controls each section in accordance with the signal supplied.

The video processing section 150 obtains the video signal supplied from the video interface 160. Further, the video processing section 150 obtains a signal of an on-screen image such as a GUI for operating the projector 1000 from the control section 110. The video processing section 150 is provided with a video RAM (VRAM) 151, and has an area for developing the video signal and an area for developing the signal of the on-screen image, and develops the signals in the respective areas. The video processing section 150 is provided with a variety of image processing functions, and performs image processing on the video signal developed in the VRAM 151 to adjust the image quality of the image to be projected. Further, in the case in which the video processing section 150 is supplied with the signal of the on-screen image from the control section 110, the video processing section 150 supplies the projection section 140 with the video signal on which the signal of the on-screen image is superimposed.

The projection section 140 for projecting the picture includes the illumination optical system 1420, the color separation optical system 1430, a light modulation device 1440, a drive circuit 1450, a combining optical system 1460, and a projection optical system 1470. Further, the projection section 140 has an optical sensor 1480 and a temperature sensor 1490.

Figure 2:
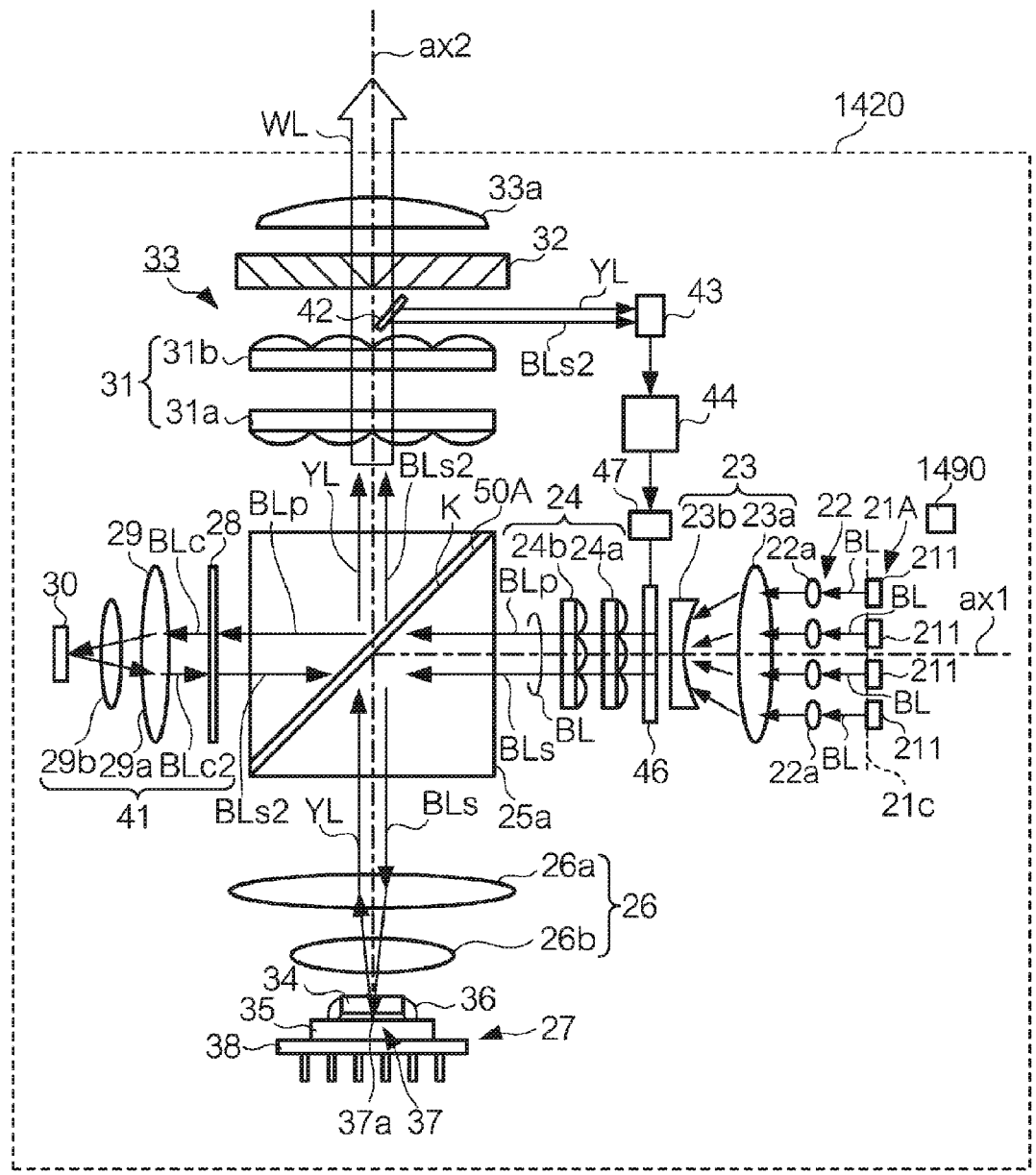
FIG. 2 is a diagram showing a configuration of an illumination optical system 1420.
Figure 3:
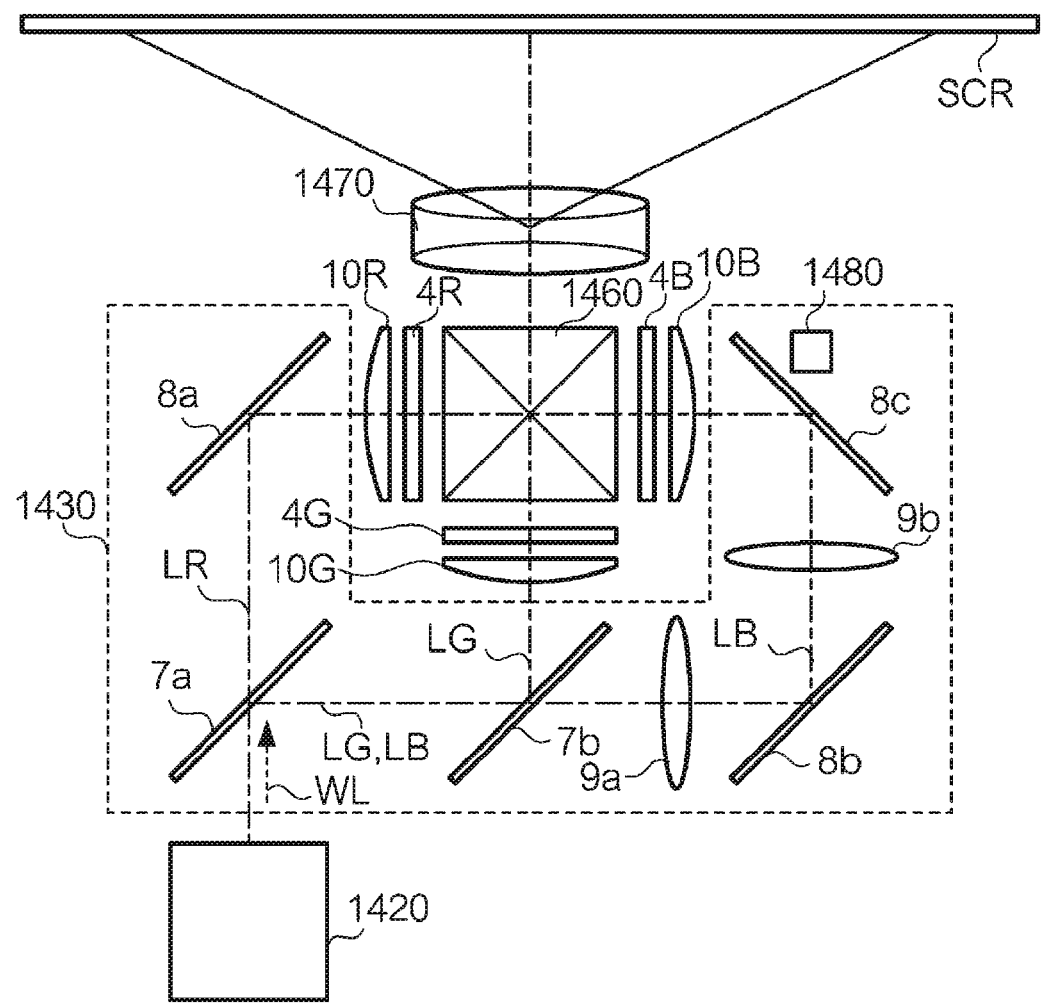
FIG. 3 is a diagram showing a configuration of a color separation optical system 1430.

FIG. 2 is a diagram showing a configuration of the illumination optical system 1420, and FIG. 3 is a diagram showing a configuration of the color separation optical system 1430. As shown in FIG. 2, the illumination optical system 1420 is provided with an array light source 21A, a collimator optical system 22, an afocal optical system 23, a wave plate 46, an electric motor 47, a homogenizer optical system 24, a prism 25A including a polarization separation element 50A, a pickup optical system 26, a light emitting element 27, an optical element 41, a polarization conversion element 32, a diffuse reflection element 30, an overlapping optical system 33, a light intensity monitoring mirror 42, a sensor unit 43, and a control device 44.

Among the constituents described above, the array light source 21A, the collimator optical system 22, the afocal optical system 23, the homogenizer optical system 24, the prism 25A, a wave plate 28, a second pickup lens 29, and the diffuse reflection element 30 are arranged in sequence on the optical axis ax1 shown in FIG. 2 in the state in which the optical centers thereof coincide with the optical center ax1. In contrast, the light emitting element 27, the pickup optical system 26, the prism 25A, an integrator optical system 31, the polarization conversion element 32, and an overlapping lens 33a are arranged in sequence on the optical axis ax2 shown in FIG. 2 in the state in which the optical centers thereof coincide with the optical axis ax2. The optical axis ax1 and the optical axis ax2 are located in the same plane, and have a positional relationship of being perpendicular to each other.

The array light source 21A is provided with a plurality of semiconductor lasers 211. The plurality of semiconductor lasers 211 is disposed in a plane 21c perpendicular to the optical axis ax1 so as to be arranged in an array. The number of the semiconductor lasers 211 is not particularly limited. Further, the semiconductor laser 211 is an example of a solid-state light source in the invention. The semiconductor lasers 211 each emit, for example, S-polarized blue light beam with a wavelength of 446 nm. The S-polarized blue light beams BL are emitted from the array light source 21A toward the collimator optical system 22.

Figure 4A:
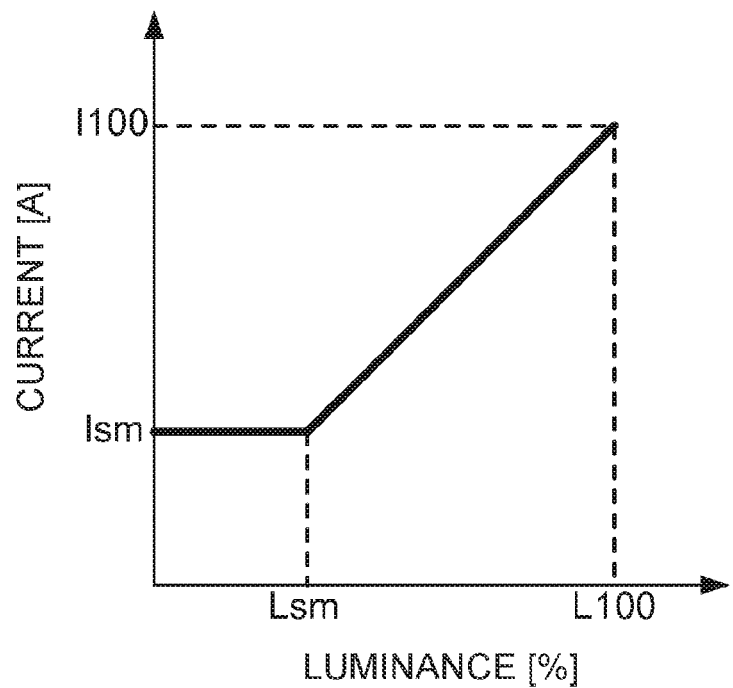
FIGS. 4A and 4B are diagrams showing an example of a current table and a Duty table.
Figure 4B:
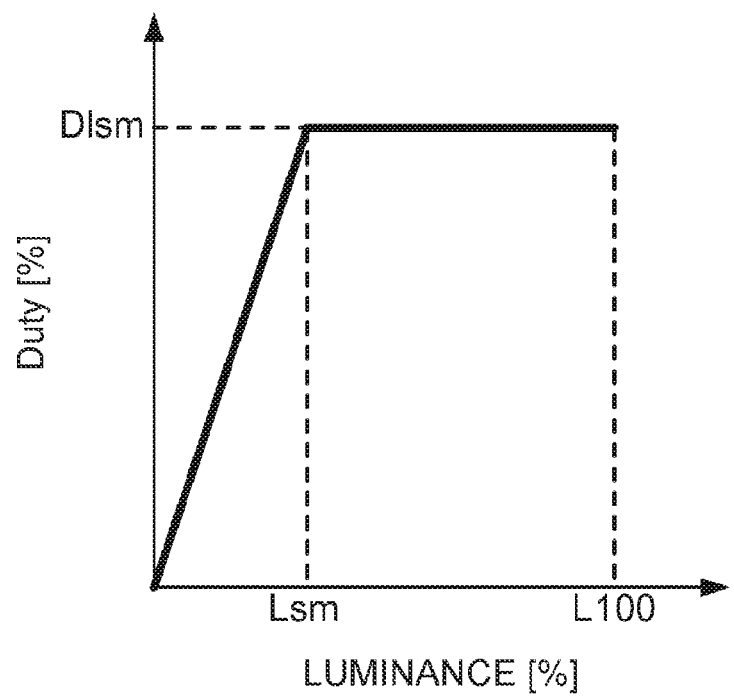

In the present embodiment, the array light source 21A is driven by a constant current or a PWM signal. FIGS. 4A and 4B are diagrams showing an example of a current table and a Duty table used when driving the array light source 21A with the constant current.

The current table shown in FIG. 4A represents the relationship between the drive current and the luminance (corresponding to the light intensity) in the case of driving the array light source 21A with the constant current. The luminance is represented by the relative luminance (%) to the luminance L100 obtained in the case of performing the constant current drive with the current I100 set in advance before shipping the array light source 21A or when replacing the array light source 21A. The current Ism corresponds to a current value set as a lower limit current with which the array light source 21A can emit light even if the array light source 21A changes in accordance with the deterioration with time or the use environment.

In the current table, the current increases in accordance with the increase in luminance in an area of luminance equal to or higher than the luminance Lsm, and the current takes the same value (the current Ism) irrespective of the luminance in an area of the luminance lower than the luminance Lsm. According to this current table, in the area of the luminance equal to or higher than the luminance Lsm, it is possible to derive the current value varying in accordance with the change in the luminance. Further, in the area of the luminance lower than the luminance Lsm, it is possible to derive the current Ism irrespective of the luminance.

The Duty table shown in FIG. 4B represents the relationship between the luminance and the duty ratio (Duty) of the PWM signal in the case of driving the array light source 21A with the PWM signal. In the area of the luminance equal to or higher than the luminance Lsm, the duty ratio of the PWM signal is set to 100% in the Duty table described above, since the array light source 21A is driven by the constant current in accordance with the current table. In contrast, in the area of the luminance lower than the luminance Lsm, it is arranged that the duty ratio of the PWM signal varies from 0 to 100% in accordance with the change in the luminance from 0 to Lsm. According to the Duty table, in the area of the luminance equal to or higher than the luminance Lsm, it is possible to derive the duty ratio Dlsm (100%) corresponding to the luminance Lsm irrespective of the luminance. Further, in the area of the luminance lower than the luminance Lsm, it is possible to derive the duty ratio corresponding to the luminance.

In the vicinity of the semiconductor lasers 211, there is disposed the temperature sensor 1490. The temperature sensor 1490 measures the temperature of the semiconductor lasers 211.

The blue light beams BL emitted from the array light source 21A enter the collimator optical system 22. The collimator optical system 22 converts the blue light beams BL emitted from the array light source 21A into parallel light beams. The collimator optical system 22 is formed of, for example, a plurality of collimator lenses 22a arranged side by side in an array. The collimator lenses 22a are disposed so as to correspond respectively to the semiconductor lasers 211.

The blue light beams BL having been transmitted through the collimator optical system 22 to thereby be converted into the parallel light enter the afocal optical system 23. The afocal optical system 23 adjusts the light beam diameter of each of the blue light beams BL. The afocal optical system 23 is formed of, for example, afocal lenses 23a, 23b.

The blue light beams BL, which has passed through the afocal optical system 23 to thereby be adjusted in the light beam diameter, enter the homogenizer optical system 24. The homogenizer optical system 24 converts the light intensity distribution of the blue light beams BL into, for example, a uniform light intensity distribution called a top-hat distribution. The homogenizer optical system 24 is formed of, for example, multi-lens arrays 24a, 24b.

The wave plate 46 is disposed on the light path between the afocal optical system 23 and the homogenizer optical system 24, more specifically, between the afocal lens 23b and the multi-lens array 24a. The wave plate 46 is disposed so as to be able to rotate in a plane, which the blue light beams BL enter. To the wave plate 46, there is connected the electric motor 47 for rotating the wave plate 46. The wave plate 46 is formed of a ½ wave plate with respect to the wavelength 446 nm of the blue light beams BL. The optical axis of the wave plate 46 crosses the polarizing axis of the blue light beam BL entering the wave plate 46. It should be noted that the optical axis of the wave plate 46 can be either one of a fast axis and a slow axis of the wave plate 46.

The blue light beams BL are each coherent S-polarized light. The blue light beams BL are each originally the S-polarized light, but the polarizing axis of each of the blue light beams BL crosses the optical axis of the wave plate 46. Therefore, by the blue light beams BL being transmitted through the wave plate 46, a part of the S-polarized light is converted into P-polarized light. As a result, the blue light beams BL transmitted through the wave plate 46 each become the light having the S-polarization component BLs and the P-polarization component BLp mixed with each other at a predetermined ratio.

The blue light beams BL having been emitted from the homogenizer optical system 24 enters the prism 25A. The prism 25A is formed of, for example, a dichroic prism having wavelength selectivity. The dichroic prism has a tilted surface K having an angle of 45° with the optical axis ax1. The tilted surface K also has an angle of 45° with the optical axis ax2. The prism 25A is disposed so that the intersection between the optical axes ax1, ax2 perpendicular to each other and the optical center of the tilted surface K coincide with each other. It is also possible to use a dichroic mirror shaped like a parallel plate instead of the prism 25A formed of the dichroic prism.

The tilted surface K is provided with the polarization separation element 50A having wavelength selectivity. The polarization separation element 50A has a polarization separation function of splitting the blue light beam BL into the S-polarization component BLs and the P-polarization component BLp with respect to the polarization separation element 50A. Specifically, the polarization separation element 50A reflects the S-polarization component BLs of the blue light beam BL and transmits the P-polarization component BLp of the blue light beam BL. The S-polarization component BLs having been reflected by the polarization separation element 50A is used for the excitation of a phosphor layer, and is therefore referred to as excitation light BLs in the following description. The P-polarization component BLp having been transmitted through the polarization separation element 50A is used as illumination light, and is therefore referred to as blue light BLp.

Further, the polarization separation element 50A has a color separation function of transmitting fluorescence YL having a yellow color different in wavelength band from the blue light beams BL emitted from the semiconductor lasers 211 irrespective of the polarization state of the fluorescence YL.

The S-polarized excitation light BLs having been emitted from the polarization separation element 50A enters the pickup optical system 26. The pickup optical system 26 converges the excitation light BLs toward the phosphor layer 34 of the light emitting element 27. The pickup optical system 26 is formed of, for example, pickup lenses 26a, 26b.

The excitation light BLs having been emitted from the pickup optical system. 26 enters the light emitting element 27. The light emitting element 27 has the phosphor layer 34 and a substrate 35 for supporting the phosphor layer 34. The excitation light BLs enters the phosphor layer 34 to thereby excite the phosphor included in the phosphor layer 34, and thus, the yellow fluorescence YL different in wavelength from the excitation light BLs is generated.

In the light emitting element 27, the phosphor layer 34 is fixed to the substrate 35 with an adhesive 36 disposed between a side surface of the phosphor layer 34 and the substrate 35 in the state in which a surface of the phosphor layer 34 located on the opposite side to the side, which the excitation light BLs enters, is made to have contact with the substrate 35. On the surface of the substrate 35 on the opposite side to the side on which the phosphor layer 34 is disposed, there is disposed a heatsink 38 for radiating the heat of the phosphor layer 34.

The fluorescence YL emitted from the phosphor layer 34 is non-polarized light with a non-uniform polarization direction, and therefore enters the polarization separation element 50A while keeping the non-polarized state after having passed through the pickup optical system 26. The fluorescence YL is transmitted through the polarization separation element 50A, and proceeds toward the integrator optical system 31.

On the other hand, the P-polarized blue light BLp having been emitted from the polarization separation element 50A enters the optical element 41. The optical element 41 is provided with a wave plate 28, a second pickup optical system 29, and a diffuse reflection element 30. The blue light BLp enters the wave plate 28. The wave plate 28 is formed of a quarter wave plate disposed in the light path between the polarization separation element 50A and the diffuse reflection element 30. Therefore, the P-polarized blue light BLp having been emitted from the polarization separation element 50A is converted by the wave plate 28 into circularly polarized blue light BLc, and then enter the second pickup optical system 29.

The second pickup optical system 29 converges the blue light BLc toward the diffuse reflection element 30. The second pickup optical system 29 is formed of, for example, pickup lenses 29a, 29b.

The diffuse reflection element 30 diffusely reflects the blue light BLc, which has been emitted from the second pickup optical system 29, toward the polarization separation element 50A. In particular, as the diffuse reflection element 30, it is preferable to use an element for causing Lambertian reflection of the blue light BLc having entered the diffuse reflection element 30. In the illumination optical system 1420, by using such kind of diffuse reflection element 30, it is possible to obtain blue light BLc2 having a roughly uniform illuminance distribution while diffusely reflecting the blue light BLc.

As shown in FIG. 2, the blue light BLc2 having diffusely been reflected by the diffuse reflection element 30 enters the wave plate 28 once again to thereby be converted from the circularly polarized blue light BLc2 to the S-polarized blue light BLs2. Therefore, the S-polarized blue light BLs2 is emitted from the optical element 41. The S-polarized blue light BLs2 enters the polarization separation element 50A. The S-polarized blue light BLs2 is reflected by the polarization separation element 50A, and then proceeds toward the integrator optical system 31.

In such a manner as described above, the blue light BLs2 is used as illumination light WL together with the fluorescence YL having been transmitted through the polarization separation element 50A. In other words, the blue light BLs2 and the fluorescence YL are emitted from the polarization separation element 50A toward the same direction. In such a manner as described above, there can be obtained the white illumination light WL having the blue light BLs2 and the fluorescence YL as the yellow light combined with each other. In other words, the polarization separation element 50A also has a function of a color combining element for combining the blue light BLs2 and the fluorescence YL with each other.

The illumination light WL having been emitted from the polarization separation element 50A enters the integrator optical system 31. The integrator optical system 31 divides the illumination light WL into a plurality of small light beams. The integrator optical system 31 is formed of, for example, a first lens array 31a and a second lens array 31b. The first lens array 31a and the second lens array 31b are each formed of an element having a plurality of microlenses arranged in an array.

The illumination light WL (the plurality of small light beams) having been emitted from the integrator optical system 31 enters the polarization conversion element 32. The polarization conversion element 32 is for uniforming the polarization direction of the illumination light WL. The polarization conversion element 32 is formed of, for example, a polarization separation film and a wave plate. The polarization conversion element 32 converts one of the polarization components into the other of the polarization components, for example, the P-polarization component into the S-polarization component, in order to uniform the polarization direction of the fluorescence YL having a non-uniform polarization direction and the polarization direction of the S-polarized blue light BLs2.

On the light path between the integrator optical system 31 and the polarization conversion element 32, there is disposed the light intensity monitoring mirror 42. The light intensity monitoring mirror 42 is disposed so as to form an angle of 45° with the optical axis ax2. The light intensity monitoring mirror 42 transmits a part of the incident light, and reflects the rest of the incident light. The light having been transmitted through the light intensity monitoring mirror 42 enters the polarization conversion element 32, and the light having been reflected by the light intensity monitoring mirror 42 enters the sensor unit 43.

It should be noted that the light intensity monitoring mirror 42 is held by a holding member disposed around the light incident area of the polarization conversion element 32. The light incident area of the polarization conversion element 32 is an area, which the plurality of small light beams having been emitted from the integrator optical system 31 enters. The light intensity monitoring mirror 42 is disposed at a position where the secondary light source image of the blue light beams BL having been emitted from the semiconductor lasers 211 is formed. Here, there is shown an example in which the light intensity monitoring mirror 42 is disposed on the light path between the integrator optical system 31 and the polarization conversion element 32. It is also possible for the light intensity monitoring mirror 42 to be disposed on the light path between the polarization conversion element 32 and the overlapping lens 33a instead of this example.

The sensor unit 43 is provided with a blue light sensor for detecting the intensity of the blue light BLs2, a yellow light sensor for detecting the intensity of the yellow fluorescence YL, and a dichroic mirror for separating the blue light BLs2 and the yellow fluorescence YL from each other. The light having been taken out from the light intensity monitoring mirror 42 enters the sensor unit 43, and the blue light BLs2 and the yellow fluorescence YL are separated from each other by the dichroic mirror. The intensity of the blue light BLs2 is detected by the blue light sensor. The intensity of the yellow fluorescence YL is detected by the yellow light sensor.

The illumination light WL, which has passed through the polarization conversion element 32 to thereby be uniformed in the polarization direction, enters the overlapping lens 33a. The overlapping lens 33a overlaps the small light beams, which have been emitted from the polarization conversion element 32, each other on the illumination object. Thus, the illumination light WL emitted from the overlapping lens 33a uniformly illuminates the illumination object. The overlapping optical system 33 is constituted by the integrator optical system 31 formed of the first lens array 31a and the second lens array 31b, and the overlapping lens 33a.

It should be noted that, in the case of the present embodiment, the light intensity monitoring mirror 42 is disposed on the light path between the integrator optical system 31 and the polarization conversion element 32. Therefore, even if the light intensity monitoring mirror 42 is disposed in the light path to take out a part of the light, there is no chance that the illuminance variation occurs on a red-light light modulation device 4R, a green-light light modulation device 4G, and a blue-light light modulation device 4B as an illumination target area described above. Therefore, if the illuminance deterioration as much as one secondary light source image can be allowed, it is not necessarily required for the light intensity monitoring mirror 42 to be a mirror for transmitting a part of the light and reflecting the rest of the light, and it is also possible for the light intensity monitoring mirror 42 to be a mirror for reflecting the whole of the light.

Then, the color separation optical system 1430, which the illumination light WL enters, will be described using FIG. 3. The color separation optical system 1430 separates the illumination light WL having been emitted from the illumination optical system 1420 into red light LR, green light LG, and blue light LB. The color separation optical system 1430 is provided with a first dichroic mirror 7a, a second dichroic mirror 7b, a first reflecting mirror 8a, a second reflecting mirror 8b, a third reflecting mirror 8c, a first relay lens 9a, and a second relay lens 9b.

The first dichroic mirror 7a has a function of separating the illumination light WL having been emitted from the illumination optical system 1420 into the red light LR, and the light including the green light LG and the blue light LB. The first dichroic mirror 7a transmits the red light LR, and reflects the green light LG and the blue light LB. The second dichroic mirror 7b has a function of separating the light having been reflected by the first dichroic mirror 7a into the green light LG and the blue light LB. The second dichroic mirror 7b reflects the green light LG and transmits the blue light LB.

The first reflecting mirror 8a is disposed in the light path of the red light LR. The first reflecting mirror 8a reflects the red light LR, which has been transmitted through the first dichroic mirror 7a, toward the red-light light modulation device 4R. The second reflecting mirror 8b and the third reflecting mirror 8c are disposed in the light path of the blue light LB. The second reflecting mirror 8b and the third reflecting mirror 8c reflect the blue light LB, which has been transmitted through the second dichroic mirror 7b, toward the blue-light light modulation device 4B. The green light LG is reflected by the second dichroic mirror 7b, and then proceeds toward the green-light light modulation device 4G.

The first relay lens 9a and the second relay lens 9b are disposed on the light emission side of the second dichroic mirror 7b in the light path of the blue light LB. The first relay lens 9a and the second relay lens 9b have a function of compensating the optical loss of the blue light LB due to the fact that the optical path length of the blue light LB becomes longer than the optical path lengths of the red light LR and the green light LG.

The red-light light modulation device 4R, the green-light light modulation device 4G, and the blue-light light modulation device 4B are light modulation devices provided to the light modulation device 1440. The drive circuit 1450 controls the red-light light modulation device 4R, the green-light light modulation device 4G, and the blue-light light modulation device 4B in accordance with a video signal supplied from the video processing section 150.

The red-light light modulation device 4R modulates the red light LR in accordance with the control by the drive circuit 1450 to form image light corresponding to the red light LR. The green-light light modulation device 4G modulates the green light LG in accordance with the control by the drive circuit 1450 to form image light corresponding to the green light LG. The blue-light light modulation device 4B modulates the blue light LB in accordance with the control by the drive circuit 1450 to form image light corresponding to the blue light LB.

As the red-light light modulation device 4R, the green-light light modulation device 4G, and the blue-light light modulation device 4B, there are used, for example, transmissive liquid crystal panels. Further, in the incident side and the exit side of each of the liquid crystal panels, there are disposed a pair of polarization plates not shown. The pair of polarization plates transmit the linearly-polarized light in a specific direction.

On the incident side of the red-light light modulation device 4R, there is disposed a field lens 10R. On the incident side of the green-light light modulation device 4G, there is disposed a field lens 10G. On the incident side of the blue-light light modulation device 4B, there is disposed a field lens 10B. The field lens 10R collimates the red light LR entering the red-light light modulation device 4R. The field lens 10G collimates the green light LG entering the green-light light modulation device 4G. The field lens 10B collimates the blue light LB entering the blue-light light modulation device 4B.

The combining optical system 1460 combines the image light corresponding to the red light LR, the image light corresponding to the green light LG, and the image light corresponding to the blue light LB with each other, and then emits the image light thus combined toward the projection optical system 1470. As the combining optical system 1460, there is used, for example, a cross dichroic prism.

The projection optical system 1470 is formed of a projection lens group including a plurality of projection lenses. The projection optical system 1470 projects the image light combined by the combining optical system 1460 toward the screen SCR in an enlarged manner. Thus, a color image thus enlarged is displayed on the screen SCR.

The optical sensor 1480 is disposed in the vicinity of the third reflecting mirror 8c, and on an opposite side to the side, which the blue light LB enters, in the third reflecting mirror 8c. The third reflecting mirror 8c transmits a part of the blue light LB having entered the third reflecting mirror 8c, and the blue light LB having been transmitted through the third reflecting mirror 8c enters the optical sensor 1480. The optical sensor 1480 detects the light intensity of the blue light LB having entered the optical sensor 1480.

Figure 5:
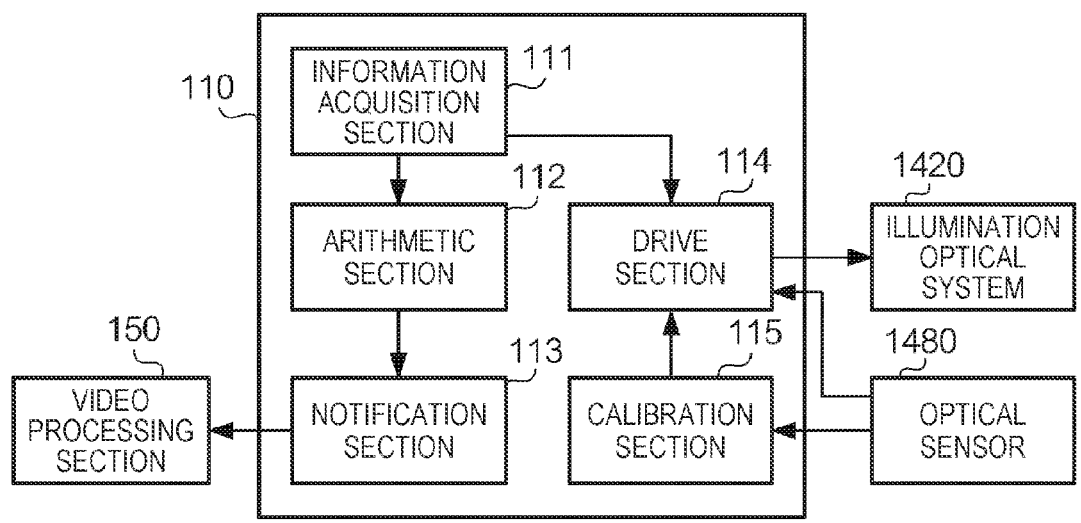
FIG. 5 is a functional block diagram of a function realized by a control section 110.

FIG. 5 is a functional block diagram showing a configuration of the functions realized by the control section 110 executing the program. An information acquisition section 111 obtains the information representing the luminance of the array light source 21A set by the user. An arithmetic section 112 calculates the time, for which the array light source 21A can be used, using the luminance represented by the information obtained by the information acquisition section and the measurement result of the optical sensor 1480. A notification section 113 outputs an on-screen signal so that the time calculated by the arithmetic section 112 is projected to notify the user of the time calculated by the arithmetic section 112. A drive section 114 drives the array light source 21A so as to emit the light with the luminance represented by the information obtained by the information acquisition section 111. A calibration section 115 perform calibration on the current table and the Duty table in accordance with the measurement result by the optical sensor 1480.

Operation Example of Embodiment

Figure 6:
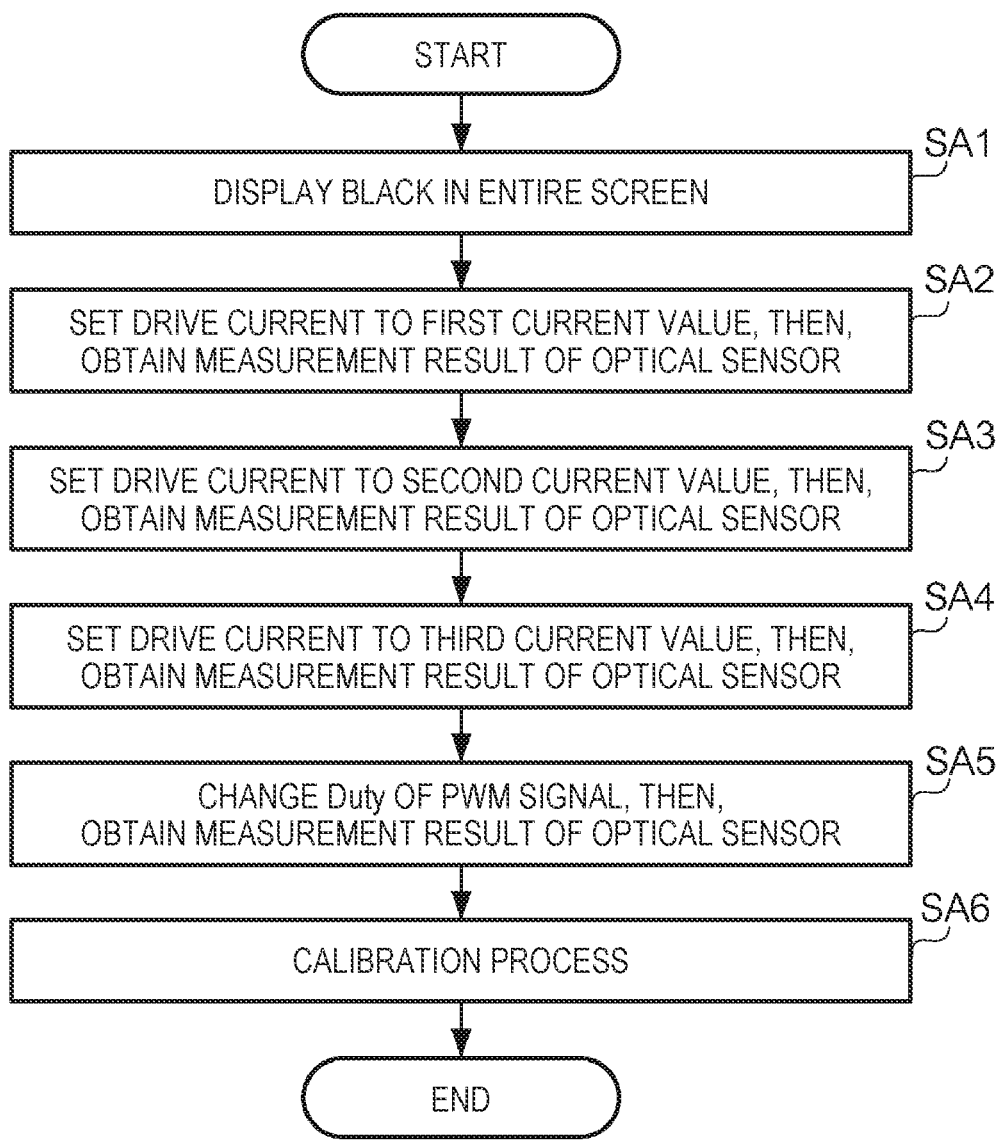
FIG. 6 is a flowchart showing a flow of a process executed by the control section 110.
Figure 7:
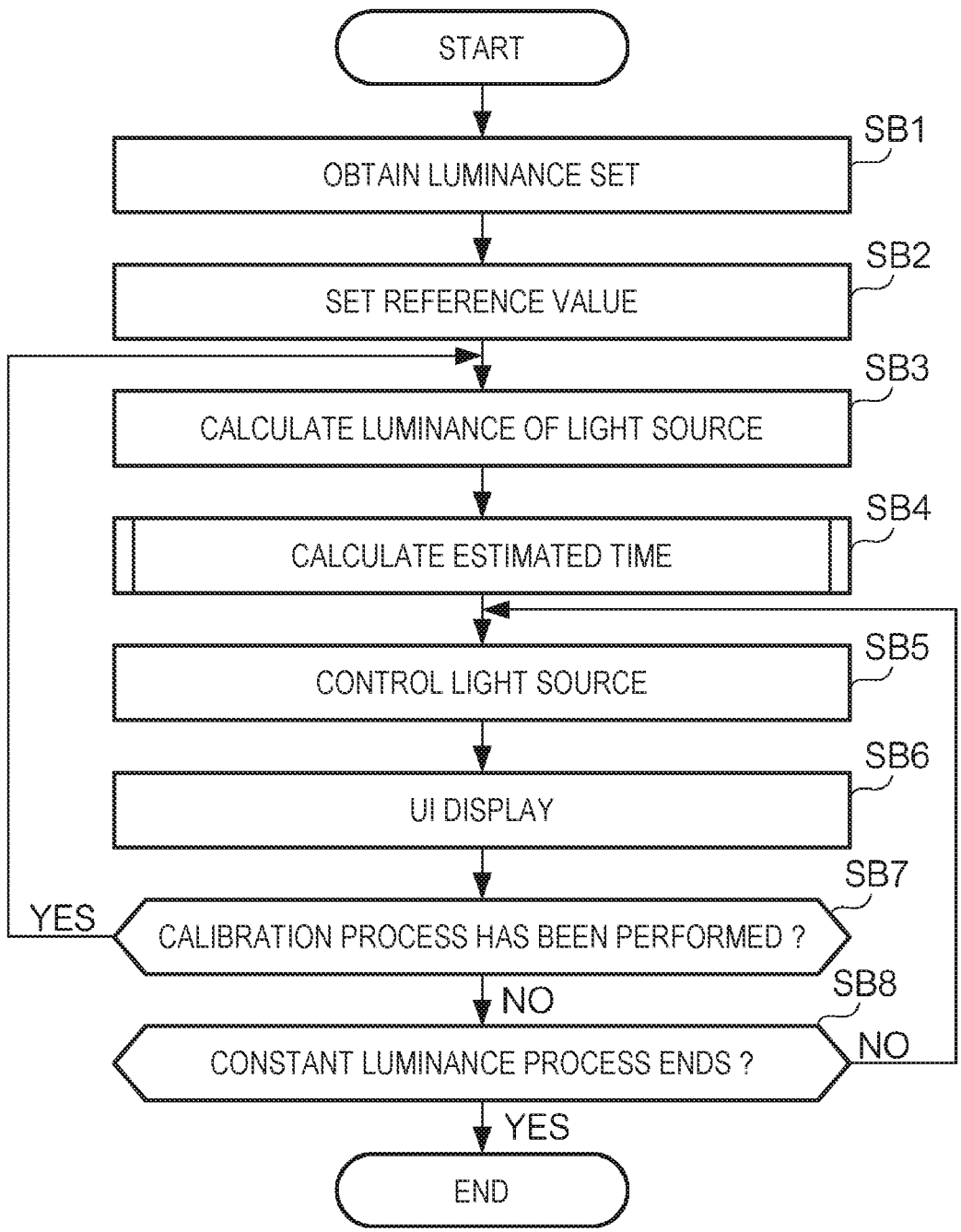
FIG. 7 is a flowchart showing a flow of a process executed by the control section 110.
Figure 8:
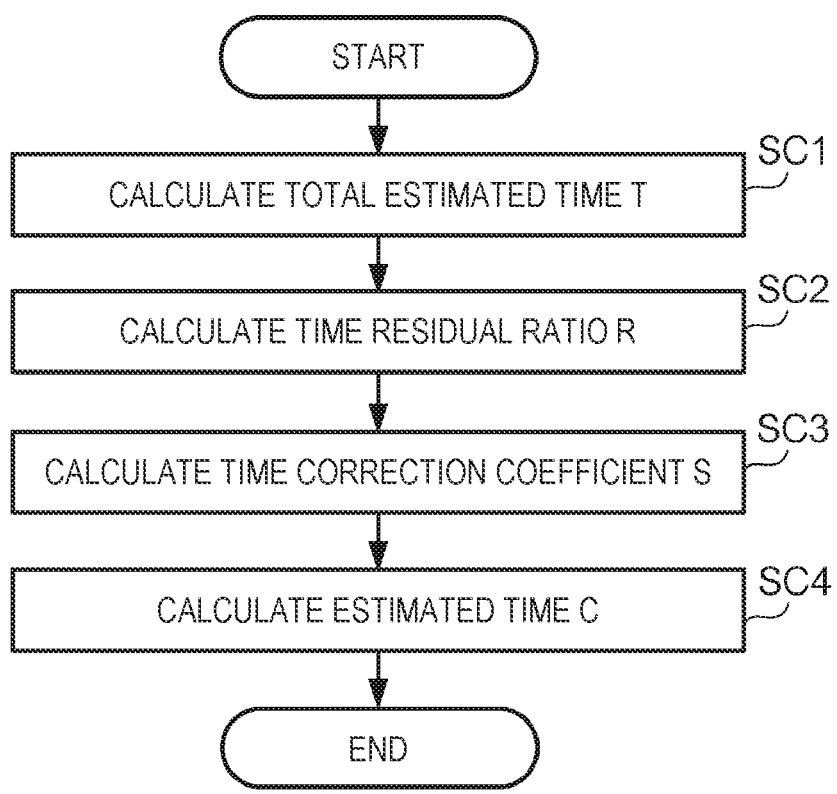
FIG. 8 is a flowchart showing a flow of a process executed by the control section 110.

FIGS. 6 through 8 are flowcharts each showing a flow of a process executed by the control section 110. The operation example of the case of providing the user with the information related to the light source of the projector 1000 will be described using FIGS. 6 through 8.

FIG. 6 is a flowchart showing the procedure of a calibration process performed by the control section 110 when the lighting time of the array light source 21A fulfills a predetermined condition. The control section 110 measures the lighting lime of the array light source 21A, and performs a calibration process every time the predetermined time elapses.

When starting the calibration process, the control section 110 first sets all of the red-light light modulation device 4R, the green-light light modulation device 4G, and the blue-light light modulation device 4B to a state of displaying black (step SA1). Then, the control section 110 sets the drive current of the array light source 21A to a first current value, and then obtains the measurement result of the optical sensor 1480 (step SA2). Further, the control section 110 sets the drive current of the array light source 21A to a second current value, obtains (step SA3) the measurement result of the optical sensor 1480, further sets the drive current of the array light source 21A to the third current value, and then obtains (step SA4) the measurement result of the optical sensor 1480. It should be noted that the first current value is set to the current I100 described above, the third current value is set to the current Ism described above, and the second current value is set to a current value between the first current value and the third current value.

Then, the control section 110 sets the drive current of the array light source 21A to the third current value, then changes Duty of the PWM signal for driving the array light source 21A, and then obtains (step SA5) the measurement result of the optical sensor 1480. Here, the control section 110 obtains the measurement result when setting Duty of the PWM signal to 0%, and the measurement result when setting Duty of the PWM signal to 100%.

Then, the control section 110 performs (step SA6) the calibration process. Specifically, the control section 110 sets the drive current to the first current value, the second current value, and the third current value also before shipping the projector 1000 and when the array light source 21A has been replaced, and then stores the measurement result of the optical sensor 1480 at each of the current values to the storage section 120. The control section 110 does not update the measurement result stored in the storage section 120 in the case in which the change ratio of the measurement result obtained in the steps SA2 through SA4 is within a predetermined range from the change ratio of the measurement result stored in the storage section 120, and updates the measurement result stored in the storage section 120 with the measurement result obtained in the case in which the change ratio is out of the predetermined range.

Further, the control section 110 sets Duty of the PWM signal to 0% and 100% also before shipping the projector 1000 and when the array light source 21A has been replaced, and then stores the measurement result of the optical sensor 1480 at each Duty to the storage section 120. The control section 110 does not update the measurement result stored in the storage section 120 in the case in which the change ratio of the measurement result obtained in the step SA5 is within a predetermined range from the change ratio of the measurement result stored in the storage section 120, and updates the measurement result stored in the storage section 120 in the case in which the change ratio is out of the predetermined range.

Figure 9A:
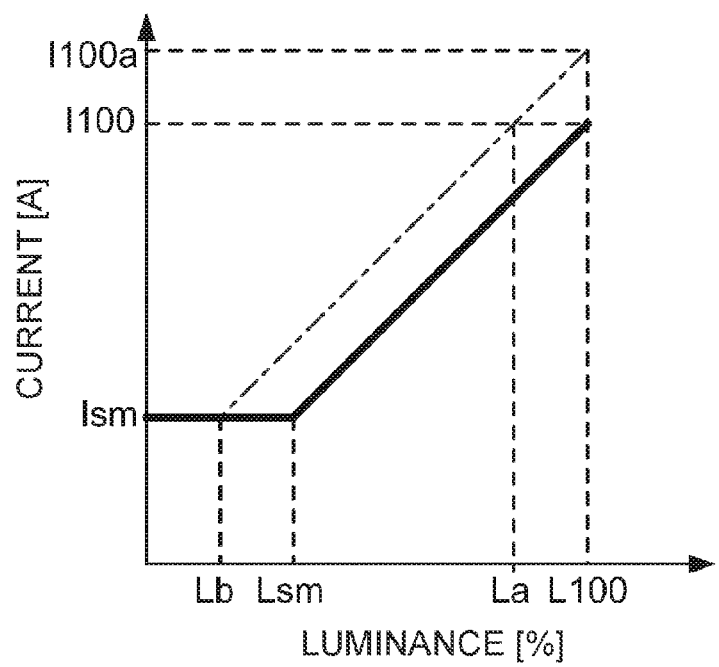
FIGS. 9A and 9B are diagrams showing an example of a current table and a Duty table.
Figure 9B:
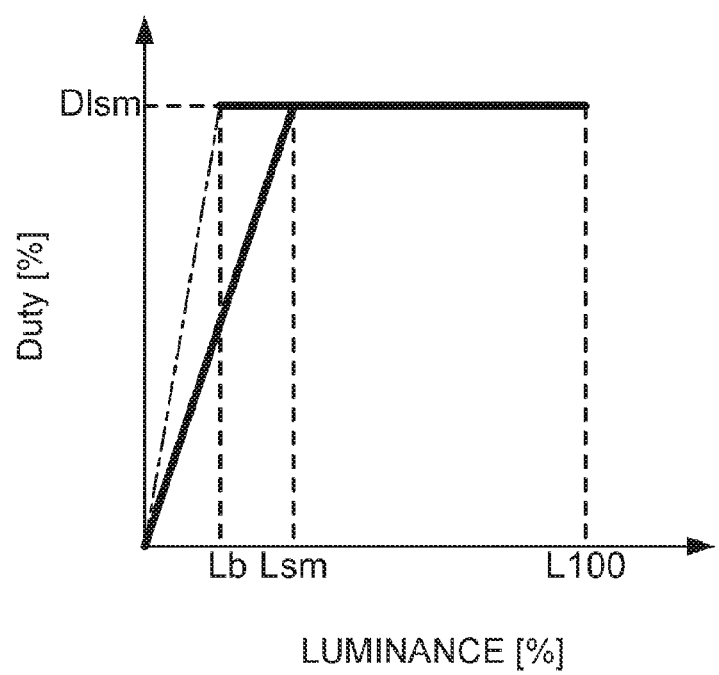

The control section 110 updates the current table and the Duty table in the case in which the measurement result stored by the storage section 120 has been updated. Here, an update process of the tables will be described using FIGS. 9A and 9B. FIGS. 9A and 9B are diagrams for explaining the update process of the tables. In FIG. 9A, the solid line indicates the current table at the shipment.

In the case in which the luminance obtained in the measurement result of the optical sensor 1480 decreases to La % when driving the array light source 21A with the first current value (the current I100), and the luminance obtained in the measurement result of the optical sensor 1480 decreases to Lb % when driving the array light source 21A with the third current value (the current Ism) due to the deterioration of the array light source 21A, by performing an interpolation calculation between the luminance at the third current value and the luminance at the first current value, the current table indicated by the dashed-dotted line can be obtained.

Further, in FIG. 9B, the solid line indicates the Duty table at the shipment. In the case in which the luminance obtained in the measurement result of the optical sensor 1480 decreases to Lb % when driving the array light source 21A with the third current value (the current Ism) due to the deterioration of the array light source 21A, by performing the interpolation calculation between the luminance Lb at Duty of 0% and the luminance at Duty of 100%, the Duty table indicated by the dashed-dotted line can be obtained.

Then, a constant light intensity process will be described. FIG. 7 is a flowchart showing a flow of the constant process for making the luminance of the array light source 21A constant. When an operation of setting the luminance of the array light source 21A to a constant luminance has been performed by the user, the control section 110 obtains (step SB1) the preset value set by the user. Here, for example, the preset value of the luminance is set within a range of 0% through 100%. When the control section 110 obtains the preset value, the control section 110 sets (step SB2) the measurement result, which is obtained in the case of setting the drive current of the array light source 21A to the first current value, as a reference value out of the measurement results stored in the storage section 120.

Then, the control section 110 calculates (step SB3) the luminance of the array light source 21A. Here, the control section 110 obtains the measurement result of the optical sensor 1480 at this moment from the optical sensor 1480. Then, the control section 110 calculates the output using the following formula: "(luminance of light source)=(preset value)*(reference value)/(present value)". The reference value is the measurement result obtained from the storage section 120 in the step SB2, and the present value is the measurement result of the optical sensor 1480 at this moment.

Then, the control section 110 performs (step SB4) the calculation of estimated time, for which the luminance set by the user can be kept, in the procedure shown in FIG. 8. FIG. 8 is a flowchart showing the procedure of the calculation process of the estimated time. Firstly, the control section 110 performs (step SC1) calculation of total estimated time T. Here, the control section 110 obtains the total estimated time T, for which the array light source 21A can keep the luminance set by the user, using the luminance L0 set in the step SB1 as the input, and using a predetermined polynomial or a table.

Then, the control section 110 performs (step SC2) calculation of a time residual ratio R. Here, the control section 110 obtains the remaining time g(L0), for which the array light source 21A can be driven, when the user sets the luminance using the luminance L0 set in the step SB1 as the input, and using a predetermined polynomial or a table. Further, the control section 110 obtains the remaining time g(L1), for which the array light source 21A can be driven, at the time point of performing the step SC2 using the luminance L1 obtained in the step SB3 as the input, and using a predetermined polynomial or a table. Then, the control section 110 obtains the time residual ratio R using the following formula: "(time residual ratio R)=g(L1)/g(L0)". It should be noted that if the array light source 21A continues to be used, the array light source 21A deteriorates, and the luminance decreases even with the same drive current. The control section 110 increases the drive current of the array light source 21A due to the current table thus calibrated in order to obtain the luminance set by the user, and if the drive current is increased, the remaining time g(L1) decreases with the elapse of time, and the time residual ratio R decreases.

When the control section 110 ends the calculation of the time residual ratio R, then the control section 110 calculates (step SC3) a time correction coefficient S. Specifically, the control section 110 obtains the time correction coefficient S using the following formula: "(time correction coefficient S)=1−(1−(h1−h0)/(g(L0)−g(L1)))*K". Here, (h1−h0) corresponds to the drive time of the array light source 21A. Further, K is an adjustment value for adjusting the ratio of applying the time correction coefficient S, and is set in accordance with, for example, an average temperature during use obtained by the temperature 1490. The value "g(L0)−g(L1)" is the drive time of the array light source 21A calculated based on the luminance detected by the optical sensor 1480.

Then, the control section 110 calculates (step SC4) the estimated time C, for which the luminance set by the user can be kept, using the following formula: "(estimated time C)=(total estimated time T)*(time residual ratio R)*(time correction coefficient S)". When the control section 110 ends the process in the step SC4, the control section 110 moves the flow of the process to the step SB5.

When the control section 110 ends the calculation of the estimated time C, the control section 110 controls (step SB5) the array light source 21A so as to obtain the luminance set by the user. Here, the control section 110 drives the array light source 21A using the current table or the Duty table in accordance with the luminance obtained in the step SB3. Further, the control section 110 controls (step SB6) the sections so that the UI display of the estimated time C calculated is performed in the on-screen image.

When the control section 110 ends the process in the step SB6, the control section 110 determines whether or not the calibration process shown in FIG. 6 to be performed at a different timing from the process shown in FIG. 7 has newly been performed. In the case in which the calibration process has newly been performed (YES in the step SB7), the control section 110 returns the flow of the process to the step SB3. In the case in which the calibration process has not newly been performed (NO in the step SB7), the control section 110 moves the flow of the process to the step SB8.

In the step SB8, the control section 110 determines whether or not the termination of the process of making the luminance constant has been instructed by the user. In the case in which the termination of the process of making the luminance constant has not been instructed by the user (NO in the step SB8), the control section 110 returns the flow of the process to the step SB5. In the case in which the termination of the process of making the luminance constant has been instructed by the user (YES in the step SB8), the control section 110 ends the process shown in FIG. 7.

According to the present embodiment, since the estimated time, for which the luminance set by the user can be kept, is projected due to the process in the step SB6, it is possible for the user to know the state of the light source.

Modified Examples

Although the embodiment of the invention is described hereinabove, the invention is not limited to the embodiment described above, but can be implemented in other various forms. For example, the invention can be implemented by modifying the embodiment described above as follows. It should be noted that the embodiment described above and the following modified examples can be implemented alone or in arbitrary combination.

Although in the embodiment described above, in the case in which the operation of setting the luminance constant is performed, the estimated time, for which the luminance set by the user can be kept, is displayed, it is also possible to arrange that the estimate time, for which the light source can be used, is displayed even in the case in which the operation of setting the luminance constant has not been performed.

For example, the control section 110 performs the calculation of the estimated time, for which the luminance can be kept in the case of continuing the use with the luminance set, in the procedure shown in FIG. 8 every time the user performs setting of the luminance in the menu screen. It should be noted that in the present modified example, the control section 110 obtains the total estimated time T, for which the luminance set by the user can be kept, using the luminance L0 thus set as the input, and using a predetermined polynomial or a table, for example.

Further, regarding the time residual ratio R, the control section 110 obtains the remaining time g(Ls0), for which the array light source 21A can be driven, at the shipment or at the replacement of the array light source 21A using the luminance Ls0 set at the shipment or at the replacement of the array light source 21A as the input, and using a predetermined polynomial or a table. Further, the control section 110 obtains the remaining time g(Ls1), for which the array light source 21A can be driven, at the time point of performing the step SC2 using the luminance Ls1 set by the user as the input, and using a predetermined polynomial or a table. Then, the control section 110 obtains the time residual ratio R using the following formula: "(time residual ratio R)=g(Ls1)/g(Ls0)".

Then, regarding the time correction coefficient S, the control section 110 obtains the time correction coefficient S using the following formula: "(time correction coefficient S)=1−(1−(h1)/(g(Ls1)/(Ls0)))*K". Here, h1 corresponds to the drive time of the array light source 21A. Further, K is an adjustment value for adjusting the ratio of applying the time correction coefficient S, and is set in accordance with, for example, an average temperature during use obtained by the temperature 1490.

Then, the control section 110 calculates the estimated time C, for which the luminance set by the user can be kept, using the following formula using the total estimated time T, the time residual ratio R, and the time correction coefficient S related to the present modified example: "(estimated time C)=(total estimated time T)*(time residual ratio R)*(time correction coefficient S)".

Also in the present modified example, since the estimated time, for which the luminance set by the user can be kept, is projected, it is possible for the user to know the state of the light source.

Although in the embodiment described above, the blue light is emitted from the array light source 21A, and the yellow fluorescence is generated from the blue light, the configuration of generating the blue light and the yellow light is not limited to the configuration of the embodiment.

For example, it is also possible for the projector 1000 to adopt a configuration of being provided with a blue-light illumination device for generating the blue light, and a yellow-light illumination device for generating the yellow light as disclosed in JP-A-2015-129783.

In the case in which the projector 1000 is provided with the blue-light illumination device and the yellow-light illumination device, it is also possible to dispose the optical sensor 1480 in the vicinity of the first reflecting mirror 8a, and on the opposite side to the side which the red light LR enters in the first reflecting mirror 8a. The first reflecting mirror 8a transmits a part of the red light LR having entered the first reflecting mirror 8a, and the red light LR having been transmitted through the first reflecting mirror 8a enters the optical sensor 1480. The optical sensor 1480 detects the light intensity of the red light LR having entered the optical sensor 1480.

In the case of the present modified example, it is also possible to obtain the estimated use time C similarly to the embodiment with respect to each of the blue-light illumination device and the solid-state light source of the yellow-light illumination device, and then display both of the estimated time C of the light source of the blue-light illumination device and the estimated time C of the light source of the yellow-light illumination device.

What is claimed is:

1. A projector comprising:
a light source;
an information acquisition section adapted to obtain information of designating a user selected light intensity of light emitted by the light source;
an arithmetic section adapted to calculate an estimated time for which the light source can be used based on the light intensity represented by the information obtained by the information acquisition section; and
a notification section adapted to give notification of the time calculated by the arithmetic section.

2. The projector according to claim 1, further comprising:

a drive section adapted to drive the light source so that the light source emits light with the light intensity represented by the information obtained by the information acquisition section,
wherein the arithmetic section calculates the time for which the light source can be used in a state in which the light source keeps the light intensity.

3. The projector according to claim 2, further comprising:
a sensor adapted to detect the light intensity of the light emitted by the light source;
the drive section controlling a current supplied to the light source to thereby control the light intensity of the light emitted by the light source, and
a calibration section adapted to calibrate the current used to drive the light source in accordance with the light intensity detected by the sensor at a predetermined timing,
wherein the arithmetic section recalculates the time in a case in which the calibration is performed.

4. The projector according to claim 3, wherein
the calibration section calibrates the current used to drive the light source based on the light intensity detected by the sensor when setting the current to a predetermined current value, and the light intensity detected by the sensor when the drive section drives the light source in accordance with the light intensity represented by the information obtained by the information acquisition section.

5. The projector according to claim 3, wherein
the arithmetic section performs the calculation based on drive time of the light source and drive time of the light source calculated from the light intensity detected by the sensor.

6. The projector according to claim 3, wherein
the arithmetic section performs the calculation based on a ratio between estimated time, for which the light source can be used, determined in accordance with the light intensity represented by the information obtained by the information acquisition section, and estimated time, for which the light source can be used, determined in accordance with the light intensity of the light emitted by the light source.

7. The projector according to claim 6, wherein
the light intensity of the light emitted by the light source is detected by the sensor.

8. A method of controlling a projector, comprising:
obtaining information of designating a user selected light intensity of light emitted by the light source;
calculating an estimated time, for which the light source can be used with the user selected light intensity represented by the information obtained in the obtaining information; and
giving notification of the time calculated in the calculating time.

9. The method according to claim 8, further comprising:
driving the light source so that the light source emits light with the light intensity represented by the information obtained in the obtaining information,
wherein in the calculating time, the time for which the light source can be used in a state in which the light source keeps the light intensity is calculated.

10. The method according to claim 9, further comprising:
detecting the light intensity of the light emitted by the light source;
in the driving the light source, a current supplied to the light source being controlled to thereby control the light intensity of the light emitted by the light source, and calibrating the current used to drive the light source in accordance with the light intensity detected in the detecting the light intensity at a predetermined timing, wherein in the calculating time, the time is recalculated in a case in which the calibration is performed.

11. The method according to claim 10, wherein in the calibrating the current, the current used to drive the light source is calibrated based on the light intensity detected in the detecting the light intensity when setting the current to a predetermined current value, and the light intensity detected in the detecting the light intensity when the light source is driven in the driving the light source in accordance with the light intensity represented by the information obtained in the obtaining the information.

12. The method according to claim 10, wherein in the calculating time, the calculation is performed based on drive time of the light source and drive time of the light source calculated from the light intensity detected in the detecting the light intensity.

13. The method according to claim 10, wherein in the calculating time, the calculation is performed based on a ratio between estimated time, for which the light source can be used, determined in accordance with the light intensity represented by the information obtained in the obtaining information, and estimated time, for which the light source can be used, determined in accordance with the light intensity of the light emitted by the light source.

* * * * *